United States Patent
Doyle et al.

(10) Patent No.: US 10,056,660 B2
(45) Date of Patent: Aug. 21, 2018

(54) FLEXIBLE ELECTRONIC CIRCUITS INCLUDING SHAPE MEMORY MATERIALS

(71) Applicant: International Business Machines Corporation, Armonk, NY (US)

(72) Inventors: Matthew S. Doyle, Chatfield, MN (US); Jeffrey N. Judd, Oronoco, MN (US); Joseph Kuczynski, North Port, FL (US); Scott D. Strand, Rochester, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 15/367,296

(22) Filed: Dec. 2, 2016

(65) Prior Publication Data
US 2018/0159191 A1    Jun. 7, 2018

(51) Int. Cl.
| *H01R 4/01* | (2006.01) |
| *F03G 7/06* | (2006.01) |
| *H01P 1/06* | (2006.01) |

(52) U.S. Cl.
CPC .............. *H01P 1/06* (2013.01); *F03G 7/065* (2013.01)

(58) Field of Classification Search
CPC ...... C22F 1/006; H05K 3/326; H05K 3/4691; H01M 8/1039
USPC ............................. 148/563; 427/97.1; 521/27
See application file for complete search history.

(56) References Cited

U.S. PATENT DOCUMENTS

| 5,098,305 | A | 3/1992 | Krajewski et al. |
| 5,750,272 | A * | 5/1998 | Jardine ................. F16F 15/005 310/334 |
| 5,970,393 | A | 10/1999 | Khorrami et al. |
| 5,986,893 | A | 11/1999 | Leigh et al. |
| 6,655,011 | B1 * | 12/2003 | Kornrumpf .......... H01H 1/0036 257/690 |
| 6,906,262 | B2 | 6/2005 | Fujimura |
| 7,046,198 | B2 | 5/2006 | Sakiyama et al. |
| 7,129,417 | B2 | 10/2006 | Cannon et al. |
| 7,250,909 | B2 | 7/2007 | Fujishima et al. |
| 7,598,651 | B2 | 10/2009 | Kornbluh et al. |
| 8,051,656 | B1 | 11/2011 | Cripe et al. |
| 8,405,277 | B2 * | 3/2013 | Goyal ..................... F03G 7/005 310/300 |
| 9,020,571 | B2 * | 4/2015 | Chi .......................... H04B 1/38 455/566 |
| 9,635,764 | B2 * | 4/2017 | Qiu ........................ H05K 1/189 |
| 9,696,564 | B1 * | 7/2017 | Etzkorn .................. G02C 7/04 |
| 9,880,401 | B2 * | 1/2018 | Pletcher .................. G02C 7/04 |
| 2014/0160063 | A1 * | 6/2014 | Yairi ...................... G06F 3/044 345/174 |

FOREIGN PATENT DOCUMENTS

JP    2012187928 A    10/2012

OTHER PUBLICATIONS

Pandy et al., A Fully Integrated RF-Powered Contact Lens With a Single Element Display, Dec. 2010, IEEE, vol. 4 No. 6, 8 pages.*

(Continued)

*Primary Examiner* — Dean Takaoka
(74) *Attorney, Agent, or Firm* — Roy R. Salvagio; Robert R. Williams; Kennedy Lenart Spraggins LLP

(57) ABSTRACT

A flexible electronic circuit includes a shape memory material disposed within a flexible dielectric material.

19 Claims, 13 Drawing Sheets

(56) References Cited

OTHER PUBLICATIONS

Parviz, Augmented Reality in a Contact Lens, Mar. 2012, IEEE Spectrum, 6 pages.*
Thomas et al., Functional Contact Lenses for Remote Health Monitoring in Developing Countries, 2011, IEEE Global Humanitarium Conference, 6 pages.*
Murdan, Electro-responsive drug delivery from hydrogels, 2003, Elsevier B.V., 17 pages.*
Liao et al., A 3-uW CMOS Glucose Sensor for Wireless Contact-Lens Tear Glucose Monitoring, Jan. 2012, IEEE, vol. 47 No. 1, 10 pages.*
Gardfors, "Synthesis and Evaluation of Expancel® Microspheres: Replacement of a Chemical of Environmental Concern", Thesis, Umea University, Sweden, Sep. 2013, 38 pages.
Facchetti, "Dielectric materials: Gels excel", Nature Materials, vol. 7, Issue 11, pp. 839-840, Nov. 2008, URL: www.nature.com/nmat/journal/v7/n11/full/nmat2310.html.
3M, "Scotch-Weld™ Acrylic Adhesives DP805 •DP820", Technical Data, Dec. 2009, 8 pages, 3M.com (online), URL: multimedia.3m.com/mws/media/660150/scotch-weld-acrylic-adhesives-dp805-dp820.pdf.

* cited by examiner

US 10,056,660 B2

FLEXIBLE ELECTRONIC CIRCUITS INCLUDING SHAPE MEMORY MATERIALS

BACKGROUND

When high speed data signals are used on flexible material, it may be desirable to set the impedance of a signal trace to a value that is sufficient to reduce reflection and interference. In conventional systems, the impedance of the signal trace is a fixed value, based on the dimensions of the signal trace and the dielectric of the flexible material.

SUMMARY

In a particular embodiment, a flexible electronic circuit includes a shape memory material disposed within a flexible dielectric material.

In another embodiment, a process of utilizing a shape memory material to vary an impedance value of a signal trace of a flexible electronic circuit is disclosed. The process includes disposing the shape memory material in a deformed state within a flexible dielectric material of a flexible electronic circuit that includes an embedded signal trace. The process also includes heating the shape memory material to change the shape memory material from the deformed state to a non-deformed state. The embedded signal trace has a first impedance value when the shape memory material is in the deformed state, and embedded signal trace has a second impedance value when the shape memory material is in the non-deformed state.

In yet another embodiment, a process of utilizing a shape memory material to vary a distance between power plane layers of a power plane structure of a flexible electronic circuit is disclosed. The process includes disposing the shape memory material in a deformed state between a first power plane layer and a second power plane layer of the power plane structure. The process also includes heating the shape memory material to change the shape memory material from the deformed state to a non-deformed state. When the shape memory material is in the deformed state, a plane capacitance between the first power plane layer and the second power plane layer corresponds to a first plane capacitance value. When the shape memory material is in the non-deformed state, the plane capacitance corresponds to a second plane capacitance value.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Shape memory materials are "smart" materials that can be deformed from an original shape to a deformed shape and retain the deformed shape until heated to a particular temperature, resulting in a return to the original shape. Examples of shape memory materials includes a shape memory alloy (SMA) material or a shape memory polymer (SMP) material.

The present disclosure describes utilizing shape memory materials within a flexible dielectric material to adjust an impedance of a signal trace by changing a distance between the signal trace and the signal plane or by changing a distance between the signal trace and a ground plane. The present disclosure also describes utilizing shape memory materials within a flexible dielectric material to adjust a decoupling capacitance by changing a distance between power plane layers. The present disclosure further describes utilizing an SMP material as a flexible dielectric material in order to adjust the decoupling capacitance.

Figure 1:
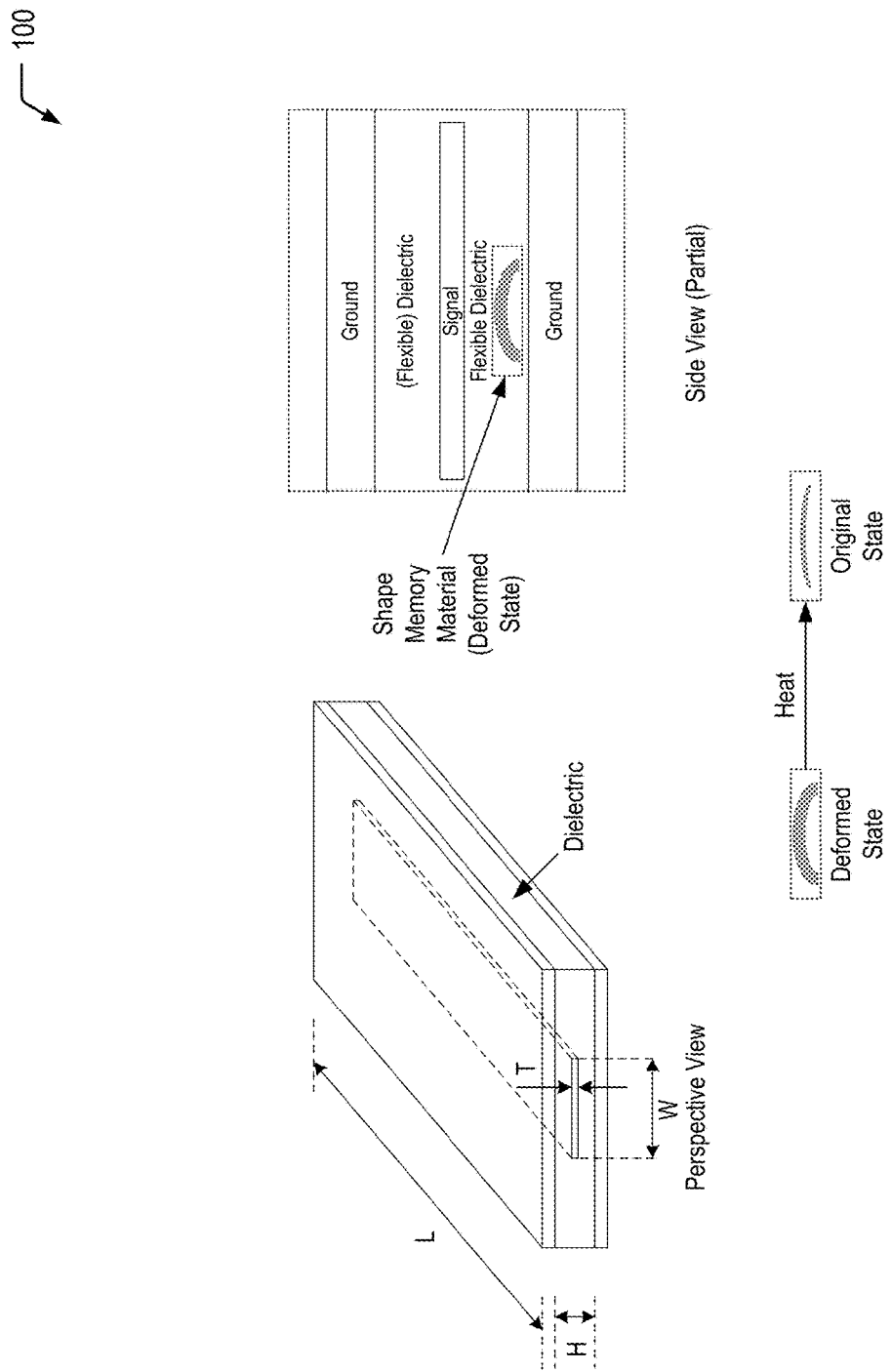
FIG. 1 is a diagram showing a particular embodiment of a signal structure that includes an embedded trace and a shape memory material disposed within a flexible dielectric material.

Referring to FIG. 1, a diagram 100 illustrates a particular embodiment of a signal structure that includes an embedded trace and a shape memory material disposed within a flexible dielectric material. In FIG. 1, a perspective view illustrates that the trace is disposed between two ground layers that define a top ground plane and a bottom ground plane, with dielectric material(s) encapsulating the trace. The trace defines a signal plane that is substantially parallel to the ground planes. In FIG. 1, a side view depicts a selected portion of the signal structure to illustrate that at least a portion of the dielectric material(s) that encapsulates the trace includes a shape memory material. As described further herein, in some cases, the shape memory material may include a shape memory alloy (SMA) material. In other cases, the shape memory material may include a shape memory polymer (SMP) material. In the side view of FIG. 1, the shape memory material is illustrated in its deformed state (resulting from application of force). FIG. 1 further illustrates that exposure of the shape memory material to heat results in a return of the shape memory material to its original state. It will be appreciated that the embodiment depicted in FIG. 1 is for illustrative purposes only and that shape memory materials may be disposed at alternative locations within various signal trace structures that include flexible dielectric material(s), as illustrated and described further herein with respect to FIGS. 2A-6B.

In a conventional signal structure that does not utilize SMA/SMP material(s) embedded within flexible dielectric material(s), the characteristic impedance of the trace, $Z_0$, is calculated from the height of the dielectric (H), the width of the trace (W), the height of the trace (T), the length of the trace (L), and the material of the dielectric ($\varepsilon_r$) according to the following equation:

$$Z_0(\Omega) = \frac{60}{\sqrt{\varepsilon_r}} \ln\left[\frac{1.9(H)}{(0.8W+T)}\right]$$

As described further herein with respect to FIGS. 2A-2B and FIGS. 3A-3B, the above equation may be modified to account for the variation in height of the flexible dielectric material(s) resulting from the change of the shape memory material from its deformed state to its original state.

Thus, FIG. 1 illustrates an example of a signal structure including an embedded trace that includes a shape memory material disposed within a flexible dielectric material. In some cases, as described further herein with respect to FIGS. 2A-2B, an SMA material may be utilized to move a signal plane. In other cases, as described further herein with respect to FIGS. 3A-3B, an SMA material may be utilized to move a ground plane. Further, while not shown in the example of FIG. 1, an SMA material (having the diaphragm shape depicted in FIG. 1 or an alternative cylindrical shape) may be disposed between power plane layers for plane capacitance alteration, as illustrated and described further herein with respect to FIGS. 4A-4B (diaphragm-shaped SMA material) and FIGS. 5A-5B (cylindrical-shaped SMA material). Further, while not shown in the example of FIG. 1, an SMP material may be utilized as a dielectric material (e.g., for plane capacitance alteration), as illustrated and described further herein with respect to FIGS. 6A-6B.

Figure 2A:
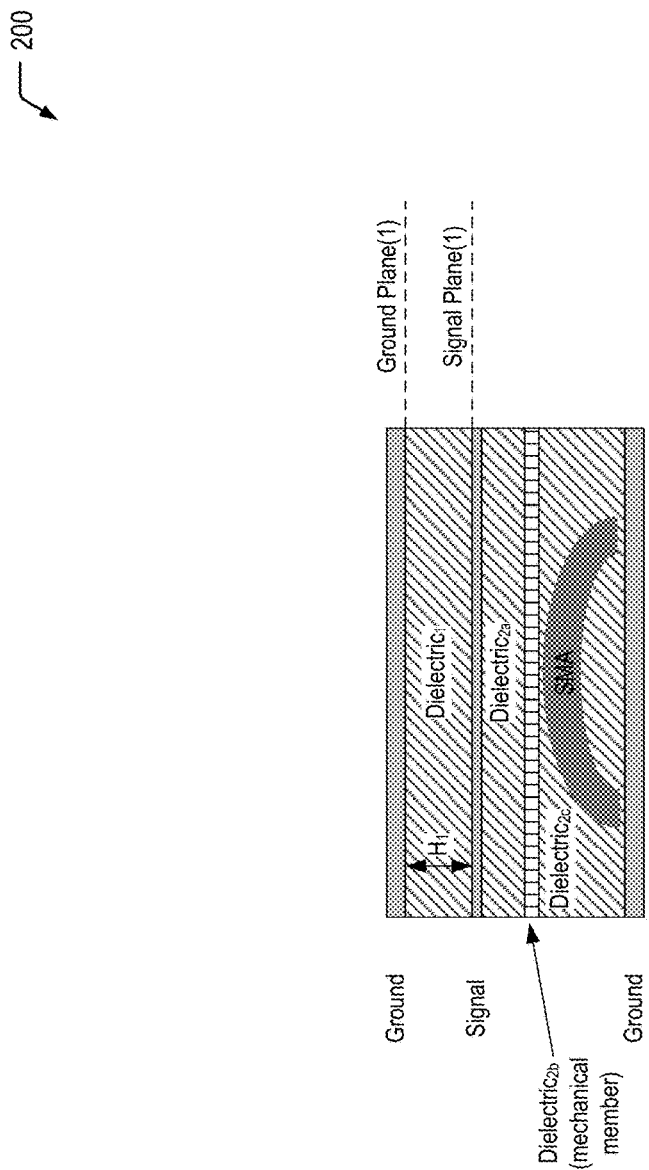
FIGS. 2A and 2B are diagrams showing a particular embodiment of an SMA trace structure moving a signal plane.
Figure 2B:
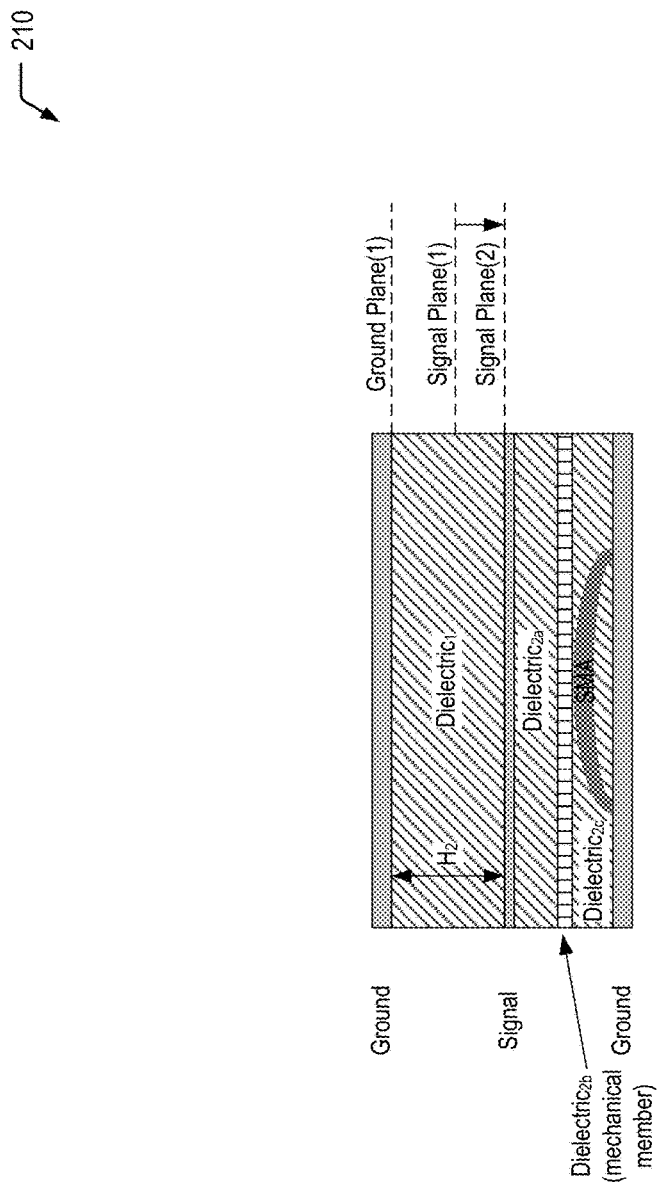

Referring to FIGS. 2A and 2B, diagrams 200 and 210 depict a first embodiment of a shape memory alloy (SMA) trace structure that enables movement of a signal plane in order to vary an impedance of a signal trace. FIG. 2A illustrates that an SMA material in a deformed shape is embedded into a flexible dielectric material. When the SMA material is in the deformed state, the trace has a first impedance value. FIG. 2B illustrates that application of heat results in a change of shape of the SMA material from the deformed shape to an original shape. When the SMA material returns to the original shape, the impedance of the trace changes from the first impedance value to a second impedance value. The dynamic impedance value of the signal trace may correspond to a change of separation between a ground plane and the signal plane that results from movement of the signal plane. In the embodiment depicted in FIGS. 2A and 2B, the SMA material is shaped as a diaphragm. In other cases, the SMA material may be cylindrically shaped, as further described herein with respect to the alternative embodiment depicted in FIGS. 5A and 5B.

The SMA trace structure depicted in FIG. 2A includes a first ground layer overlying a first dielectric material (identified as "Dielectric$_1$" in FIG. 2A), and the first dielectric material overlies a signal trace. The first ground layer defines a ground plane (identified as "Ground Plane(1)" in FIG. 2A), and the signal trace defines a signal plane (identified as "Signal Plane(1)" in FIG. 2A). The signal trace overlies a second dielectric structure, including multiple layers. The second dielectric structure includes a second dielectric layer (identified as "Dielectric$_{2a}$" in FIG. 2A), a third dielectric layer (identified as "Dielectric$_{2b}$" in FIG. 2A) that corresponds to a mechanical member, and a fourth dielectric layer (identified as "Dielectric$_{2c}$" in FIG. 2A) in which the SMA material (in its deformed state) is embedded. The second dielectric structure that includes the SMA material overlies a second ground layer. Illustrative examples of shape-memory alloys include a copper-aluminum-nickel shape-memory alloy or a nickel-titanium (NiTi) shape-memory alloy, among other alternatives.

FIG. 2A illustrates that, when the SMA material is in its deformed state, the ground plane defined by the first ground layer is separated from the signal plane by a first distance, corresponding to a first height of the first dielectric layer (designated as "H$_1$" in FIG. 2A). The first dielectric layer separating the first ground layer and the signal trace is formed from a flexible dielectric material in order to enable a change in the separation between the signal and ground planes when the SMA material changes from the deformed shape depicted in FIG. 2A to the original shape depicted in FIG. 2B.

In one embodiment, the first dielectric layer in FIG. 2A may be formed from a flexible adhesive bonding material. An example of a flexible adhesive bonding material includes a toughened acrylic structural adhesive. A first example of an acrylic adhesive may have a dielectric constant (determined according to ASTM D-150 at 23° C.) of 3.6 at 500 Hz, 3.6 at 1 KHz, 3.5 at 10 KHz, and 3.4 at 100 KHz. A second example of an acrylic adhesive may have a dielectric constant (determined according to ASTM D-150 at 23° C.) of 3.1 at 500 Hz, 3.0 at 1 KHz, 2.8 at 10 KHz, and 2.8 at 100 KHz.

In an alternative embodiment, the first dielectric layer in FIG. 2A may be formed from an ion gel dielectric material. An ion gel includes a room-temperature ionic liquid and a solid material that is infused with the ionic liquid. Ionic liquids are organic salts that are molten at room temperature, have negligible vapor pressure, and are highly ionically conducting because each molecule in the liquid is a mobile ion. As an illustrative, non-limiting example, the solid material may include a self-assembling triblock copolymer that creates a rubbery network that is infused with the ionic liquid such that, after printing from a solvent, the solvent-dried ion gel does not flow. Such ion gels are both printable and have large specific capacitances, in excess of 10 µF cm$^{-2}$. The large specific capacitance results from the mobile ions in the gel. When a voltage is applied across the gel layer, ions move to form electrical double layers at the interfaces, and such electrical double layers have very large specific capacitances.

For the flexible dielectrics, gels have been shown to exhibit the required dielectric properties and rheology. That is, the flexible dielectric must be able to expand as the shape memory material contracts. Moreover, in a typical lamination process, the applied pressure may compress the gel further than desired. To limit this compression, silica or glass spheres of the appropriate diameter may be used as stand offs.

To create a trace with dynamic impedance, a deformed SMA is embedded into the dielectric, as shown in FIG. 2A. In this state, the impedance of the trace (Z$_1$) is calculated from the first height (H$_1$) of the first dielectric layer disposed between the top ground plane and the signal plane, according to the following equation:

$$Z_1(\Omega) = \frac{60}{\sqrt{\varepsilon_r}} \ln\left[\frac{1.9(H_1)}{(0.8W+T)}\right]$$

FIG. 2B illustrates that, once the SMA is heated, the SMA returns to its original shape, resulting in a change of the height of the first dielectric layer from the first height (H$_1$)

to a second height ($H_2$). In this state, the impedance of the trace ($Z_2$) is calculated from the second height ($H_2$) of the first dielectric layer according to the following equation:

$$Z_2(\Omega) = \frac{60}{\sqrt{\varepsilon_r}} \ln\left[\frac{1.9(H_2)}{(0.8W + T)}\right]$$

Thus, FIGS. 2A and 2B illustrate a first example of an SMA trace structure that enables movement of a signal plane in order to vary an impedance of a signal trace. When the SMA material is in the deformed state (depicted in FIG. 2A), the trace has a first impedance value. When the SMA material returns to its original state (depicted in FIG. 2B), the impedance of the trace changes from the first impedance value to a second impedance value.

Figure 3A:
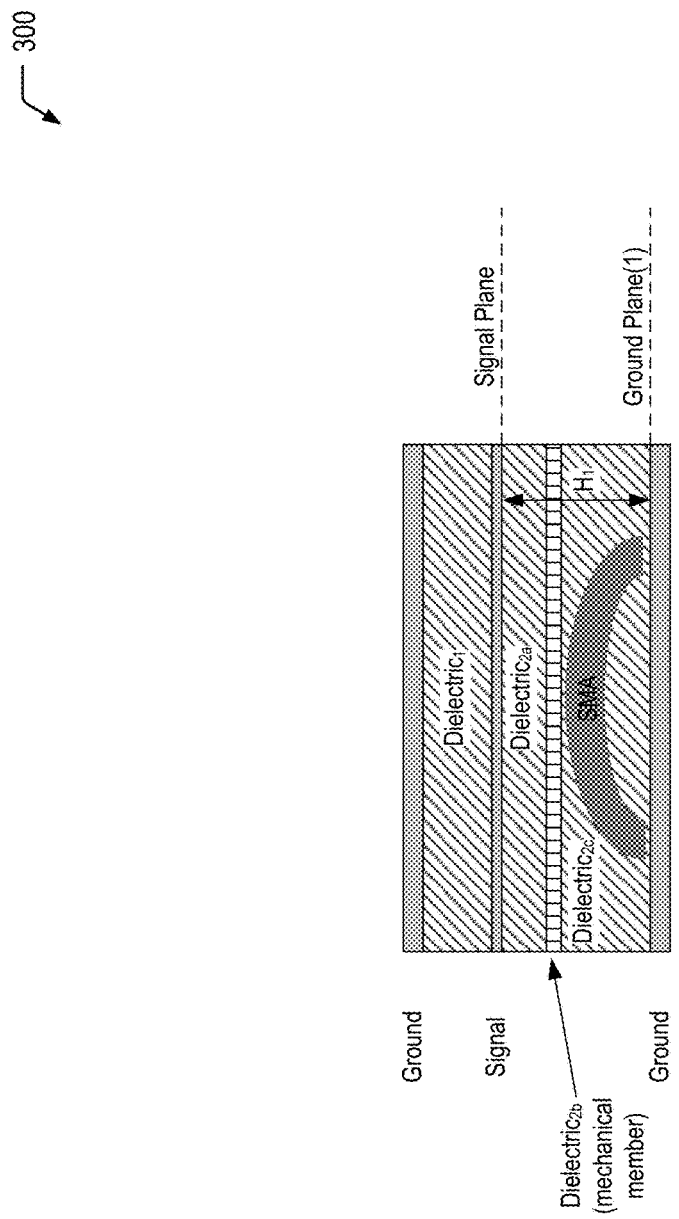
FIGS. 3A and 3B are diagrams showing a particular embodiment of an SMA trace structure moving a ground plane.
Figure 3B:
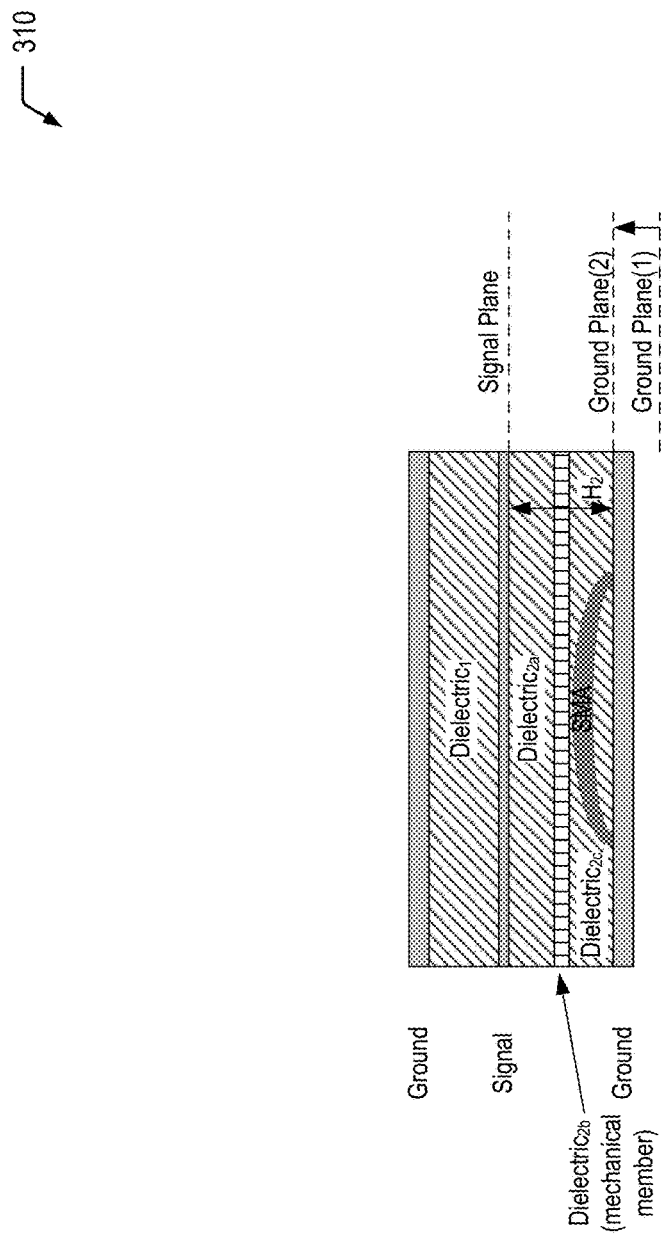

Referring to FIGS. 3A and 3B, diagrams 300 and 310 depict a second embodiment of an SMA trace structure that enables movement of a ground plane in order to vary an impedance of a signal trace. Moving the ground plane may prevent altering the coupled noise between a top ground plane and a signal plane. FIG. 3A illustrates that an SMA material in a deformed shape is embedded into a flexible dielectric material. When the SMA material is in the deformed state, the trace has a first impedance value. FIG. 3B illustrates that application of heat results in a change of shape of the SMA material from the deformed shape to an original shape. When the SMA material returns to the original shape, the impedance of the trace changes from the first impedance value to a second impedance value. The dynamic impedance value of the signal trace may correspond to a change of separation between the bottom ground plane and the signal plane that results from movement of the bottom ground plane. In the embodiment depicted in FIGS. 3A and 3B, the SMA material is shaped as a diaphragm. In other cases, the SMA material may be cylindrically shaped, as further described herein with respect to the alternative embodiment depicted in FIGS. 5A and 5B.

The SMA trace structure depicted in FIG. 3A includes a first ground layer overlying a first dielectric material (identified as "Dielectric$_1$" in FIG. 3A), and the first dielectric material overlies a signal trace. The signal trace defines a signal plane, and the signal trace overlies a second dielectric structure, including multiple layers. The second dielectric structure includes a second dielectric layer (identified as "Dielectric$_{2a}$" in FIG. 3A), a third dielectric layer (identified as "Dielectric$_{2b}$" in FIG. 3A) that corresponds to a mechanical member, and a fourth dielectric layer (identified as "Dielectric$_{2c}$" in FIG. 3A) in which the SMA material (in its deformed state) is embedded. The second dielectric structure that includes the SMA material overlies a second ground layer. The second ground layer defines a ground plane (identified as "Ground Plane(1)" in FIG. 3A).

FIG. 3A illustrates that, when the SMA material is in its deformed state, the ground plane defined by the second ground layer is separated from the signal plane by a first distance, corresponding to a first height of the second dielectric structure that includes the SMA material (designated as "$H_1$" in FIG. 3A). The dielectric material separating the mechanical member and the second ground layer is formed from a flexible dielectric material in order to enable a change in the separation between the signal and ground planes when the SMA material changes from the deformed shape depicted in FIG. 3A to the original shape depicted in FIG. 3B. As previously described herein, the flexible dielectric material may be formed from a flexible adhesive bonding material or from an ion gel dielectric material.

To create a trace with dynamic impedance, a deformed SMA is embedded into the second dielectric material, as shown in FIG. 3A. In this state, the impedance of the trace ($Z_1$) is calculated from the first height ($H_1$) of the second dielectric structure disposed between the bottom ground plane and the signal plane, according to the following equation:

$$Z_1(\Omega) = \frac{60}{\sqrt{\varepsilon_r}} \ln\left[\frac{1.9(H_1)}{(0.8W + T)}\right]$$

FIG. 3B illustrates that, once the SMA is heated, the SMA returns to its original shape, resulting in the bottom ground plane being pulled up to change the height of the second dielectric structure from the first height ($H_1$) to a second height ($H_2$). In this state, the impedance of the trace ($Z_2$) is calculated from the second height ($H_2$) of the second dielectric structure according to the following equation:

$$Z_2(\Omega) = \frac{60}{\sqrt{\varepsilon_r}} \ln\left[\frac{1.9(H_2)}{(0.8W + T)}\right]$$

Thus, FIGS. 3A and 3B illustrate a second example of an SMA trace structure that enables movement of a ground plane in order to vary an impedance of a signal trace. When the SMA material is in the deformed state (depicted in FIG. 3A), the trace has a first impedance value. When the SMA material returns to its original state (depicted in FIG. 3B), the impedance of the trace changes from the first impedance value to a second impedance value.

Figure 4A:
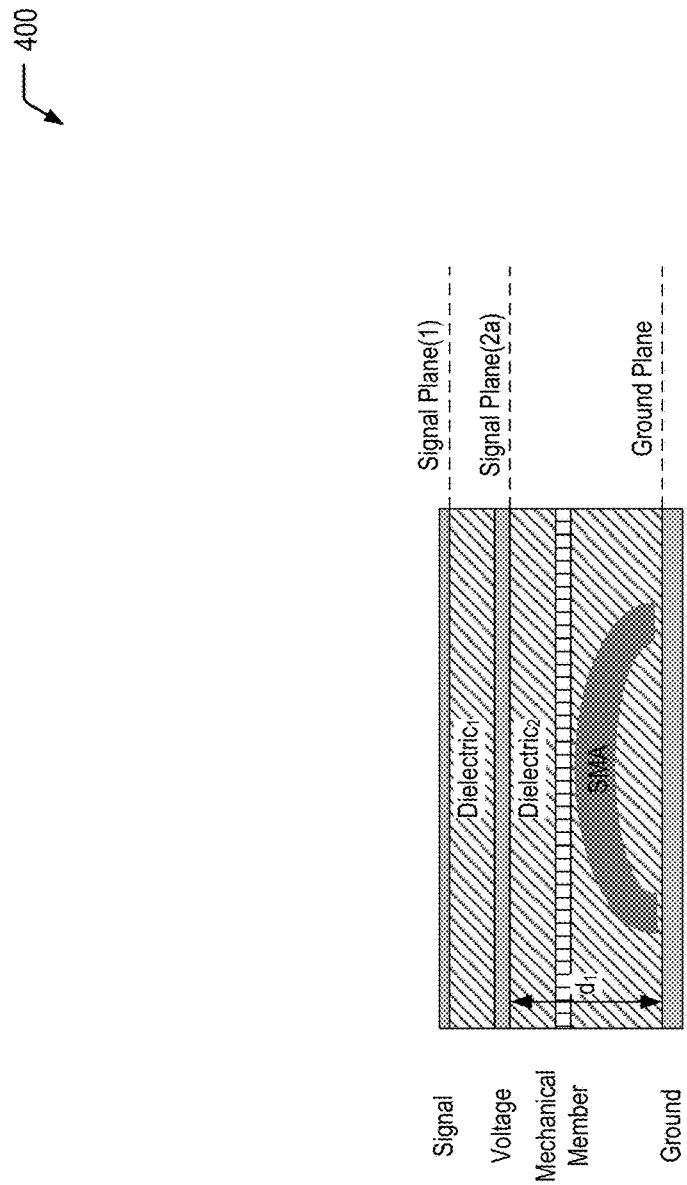
FIGS. 4A and 4B are diagrams showing a first embodiment of an SMA power plane structure changing a distance between power planes.
Figure 4B:
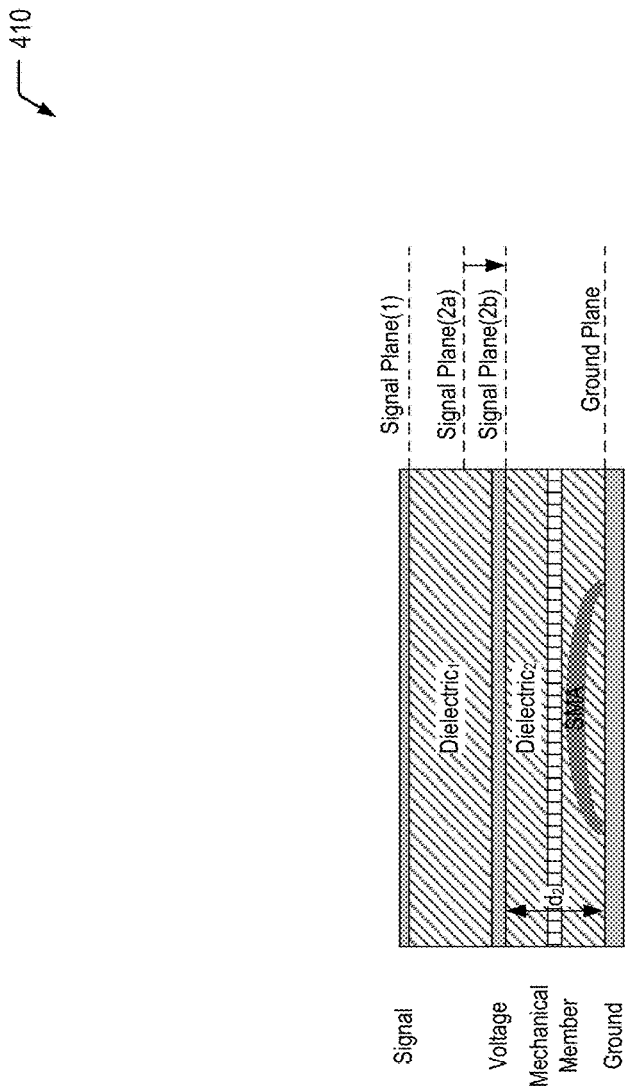

Referring to FIGS. 4A and 4B, diagrams 400 and 410 depict a first embodiment of an SMA power plane structure to enable a change in a distance between power planes. In FIGS. 4A and 4B, both dielectric materials are flexible materials to allow the change in separation of power planes. Changing the separation between power planes changes the capacitance between planes to enable tuning of a decoupling capacitance. FIG. 4A illustrates that an SMA material in a deformed shape is embedded into a flexible dielectric material. When the SMA material is in the deformed state, the SMA power plane structure has a first decoupling capacitance value. When the SMA material returns to the original shape, the plane capacitance changes from the first decoupling capacitance value to a second decoupling capacitance value. The dynamic decoupling capacitance value may correspond to a change of separation between the signal planes. In the embodiment depicted in FIGS. 4A and 4B, the SMA material is shaped as a diaphragm. In other cases, the SMA material may be cylindrically shaped, as further described herein with respect to the alternative embodiment depicted in FIGS. 5A and 5B.

The SMA power plane structure depicted in FIG. 4A includes a first signal layer overlying a first dielectric material (identified as "Dielectrics" in FIG. 2A), and the first dielectric material overlies a second signal layer. The first signal layer defines a first signal plane (identified as "Signal Plane(1)" in FIG. 4A), and the second signal layer defines a second signal plane (identified as "Signal Plane(2a)" in FIG. 4A, also referred to herein as a voltage plane). The second signal layer overlies a second dielectric structure, including multiple layers. The second dielectric structure includes a second dielectric layer that corresponds to a mechanical member, and a fourth dielectric layer in which the SMA material (in its deformed state) is embedded. The second dielectric structure that includes the SMA material overlies a second ground layer that defines a ground plane.

FIG. 4A illustrates that, when the SMA material is in its deformed state, the ground plane is separated from the voltage plane by a first distance (designated as "$d_1$" in FIG. 4A). The first dielectric material separating the signal plane from the voltage plane as well as the second dielectric material separating the ground plane from the voltage plane are formed from a flexible dielectric material in order to enable a change in separation between planes when the SMA material changes from the deformed shape depicted in FIG. 4A to the original shape depicted in FIG. 4B. As previously described herein, the flexible dielectric material may be formed from a flexible adhesive bonding material or from an ion gel dielectric material.

To alter a plane capacitance, a deformed SMA is embedded into the second dielectric material, as shown in FIG. 4A. Decoupling capacitance ($C_n$) is calculated from the relative permittivity of the dielectric (k), the permittivity of space ($8.854 \times 10^{-12}$ F/m) ($\varepsilon_0$), the area of the plates (A), and the separation of the plates ($d_n$), according to the following equation:

$$C_n(F) = \frac{k\varepsilon_0 A}{d_n}$$

In the state depicted in FIG. 4A in which the SMA material is in the deformed state, the decoupling capacitance ($C_1$) is calculated from the first distance ($d_1$) between the ground plane and the bottom power plane, according to the following equation:

$$C_1(F) = \frac{k\varepsilon_0 A}{d_1}$$

FIG. 4B illustrates that, once the SMA is heated, the SMA returns to its original shape, resulting in a change in the distance between power planes, resulting in a change of the capacitance between planes. In this state, the decoupling capacitance ($C_2$) is calculated from the second distance ($d_2$) between the ground plane and the bottom power plane (also referred to herein as the voltage plane), according to the following equation:

$$C_2(F) = \frac{k\varepsilon_0 A}{d_2}$$

Thus, FIGS. 4A and 4B illustrate an example of an SMA power plane structure that enables a change in distance between power planes. Changing the distance between power planes results in a change of capacitance between planes to tune the decoupling. When the SMA material is in the deformed state (depicted in FIG. 4A), the SMA power plane structure has a first decoupling capacitance value. When the SMA material returns to its original state (depicted in FIG. 4B), the decoupling capacitance changes from the first decoupling capacitance value to a second decoupling capacitance value.

Figure 5A:
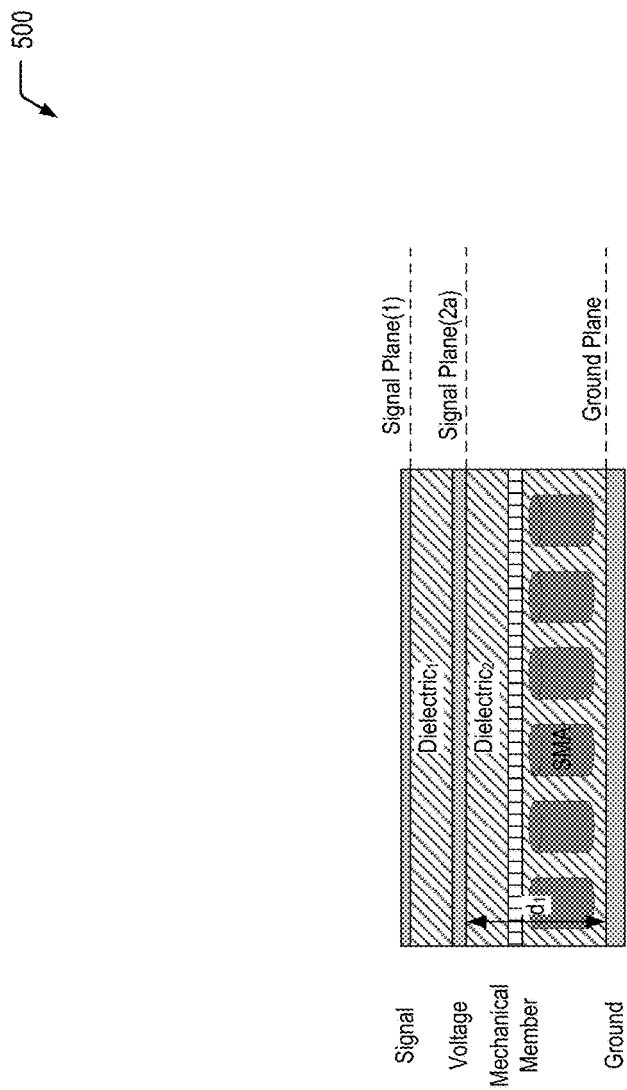
FIGS. 5A and 5B are diagrams showing a first embodiment of an SMA power plane structure changing a distance between power planes.
Figure 5B:
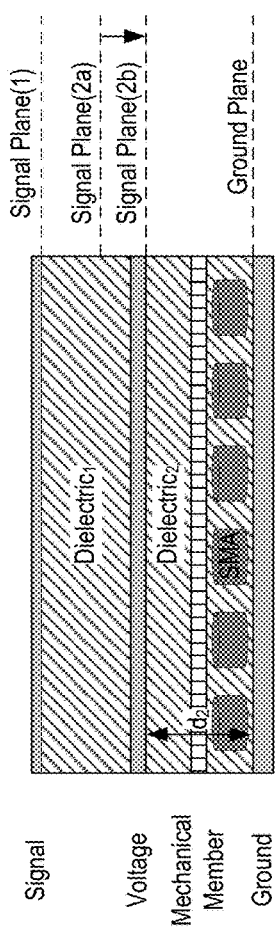

Referring to FIGS. 5A and 5B, diagrams 500 and 510 depict a second embodiment of an SMA power plane structure to enable a change in a distance between power planes. In contrast to the embodiment depicted in FIGS. 4A and 4B in which the SMA material is shaped as a diaphragm, FIGS. 5A and 5B illustrate an alternative embodiment in which the SMA material is cylindrically shaped. As in the examples depicted in FIGS. 4A and 4B, both dielectric materials are flexible materials to allow the change in separation of power planes.

In the state depicted in FIG. 5A in which the SMA material is in the deformed state (illustrated as an extended cylindrical shape), the decoupling capacitance ($C_1$) is calculated from a first distance ($d_1$) between the ground plane and the bottom power plane (also referred to herein as a voltage plane), according to the following equation:

$$C_1(F) = \frac{k\varepsilon_0 A}{d_1}$$

FIG. 5B illustrates that, once the SMA is heated, the SMA returns to its original shape (illustrated as a shortened cylindrical shape), resulting in a change in the distance between power planes, resulting in a change of the capacitance between planes. In this state, the decoupling capacitance ($C_2$) is calculated from the second distance ($d_2$) between the ground plane and the bottom power plane (also referred to herein as the voltage plane), according to the following equation:

$$C_2(F) = \frac{k\varepsilon_0 A}{d_2}$$

Thus, FIGS. 5A and 5B illustrate an example of an SMA power plane structure in which the SMA material having a deformable cylindrical shape is used to change the distance between power planes. Changing the distance between power planes results in a change of capacitance between planes to tune the decoupling. When the SMA material is in the deformed state (depicted in FIG. 5A), the SMA power plane structure has a first decoupling capacitance value. When the SMA material returns to its original state (depicted in FIG. 5B), the decoupling capacitance changes from the first decoupling capacitance value to a second decoupling capacitance value.

Figure 6A:
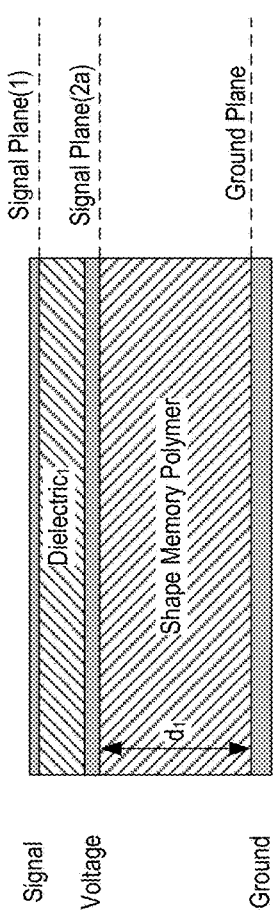
FIGS. 6A and 6B are diagrams showing a particular embodiment of a power plane structure in which an SMP material is used as a flexible dielectric material to change a distance between power planes.
Figure 6B:
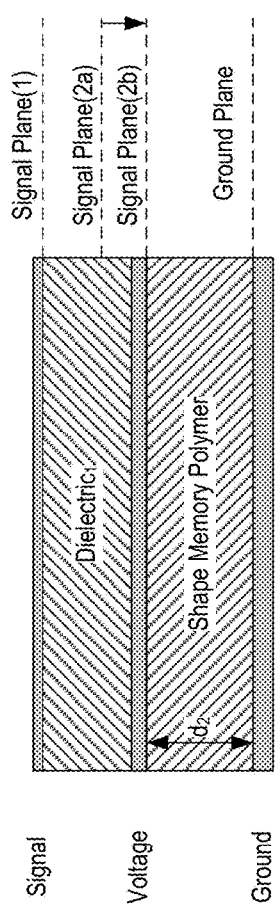

Referring to FIGS. 6A and 6B, diagrams 600 and 610 depict an embodiment of a power plane structure in which a shape memory polymer (SMP) material is used as a flexible dielectric material to enable a change in the distance between the voltage plane and the ground plane. As described herein with respect to FIGS. 4A-4B and FIGS. 5A-5B, changing the distance between power planes changes the capacitance between planes to tune the decoupling capacitance.

The power plane structure depicted in FIG. 6A includes a first signal layer overlying a first dielectric material (identified as "Dielectric$_1$" in FIG. 6A), and the first dielectric material overlies a second signal layer. As previously described herein, the flexible dielectric material may be formed from a flexible adhesive bonding material or from an ion gel dielectric material. The first signal layer defines a first signal plane (identified as "Signal Plane(1)" in FIG. 6A), and the second signal layer defines a second signal plane (identified as "Signal Plane(2a)" in FIG. 6A, also referred to herein as a voltage plane). The second signal layer overlies the SMP material (in its expanded state) that is used as a flexible dielectric material. The SMP material overlies a second ground layer that defines a ground plane.

FIG. 6A illustrates that, when the SMP material is in its expanded state, the ground plane is separated from the voltage plane by a first distance (designated as "$d_1$" in FIG. 6A). The first flexible dielectric material separating the signal plane from the voltage plane and the SMP material separating the ground plane from the voltage plane enable a change in separation between planes when the SMP material contracts from the expanded shape depicted in FIG. 6A to its original shape depicted in FIG. 6B.

In the state depicted in FIG. 6A in which the SMP material is in the deformed/expanded state, the decoupling capacitance ($C_1$) is calculated from the first distance ($d_1$) between the ground plane and the voltage plane, according to the following equation:

$$C_1(F) = \frac{k\varepsilon_0 A}{d_1}$$

FIG. 6B illustrates that, once the SMP material is heated, the SMP material contracts to its original shape, resulting in a change in the distance between power planes, resulting in a change of the capacitance between planes. In this state, the decoupling capacitance ($C_2$) is calculated from the second distance ($d_2$) between the ground plane and the voltage plane, according to the following equation:

$$C_2(F) = \frac{k\varepsilon_0 A}{d_2}$$

Thus, FIGS. 6A and 6B illustrate an example of a power plane structure in which a dielectric material is formed from an SMP material that is used to change the distance between power planes. Changing the distance between power planes results in a change of capacitance between planes to tune the decoupling. When the SMP material is in the deformed state (depicted in FIG. 6A), the power plane structure has a first decoupling capacitance value. When the SMP material returns to its original state (depicted in FIG. 6B), the decoupling capacitance changes from the first decoupling capacitance value to a second decoupling capacitance value.

Figure 7:
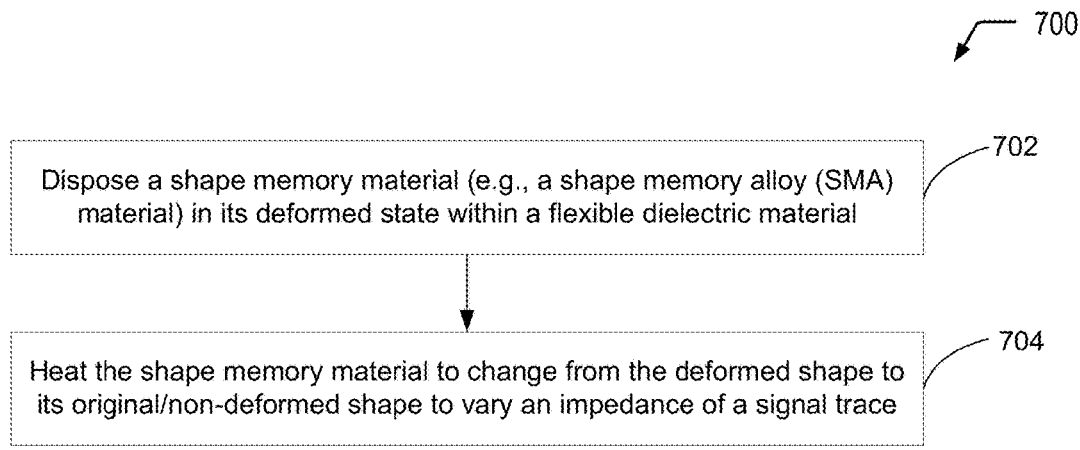
FIG. 7 is a flow diagram showing a particular embodiment of a process of utilizing a shape memory material to vary an impedance of a signal trace.

Referring to FIG. 7, a flow diagram illustrates an example of a process 700 of utilizing a shape memory material disposed within a flexible dielectric material to vary an impedance of a signal trace, according to one embodiment. In some cases, the shape memory material (e.g., an SMA material) may be utilized to move a signal plane. In other cases, the shape memory material may be utilized to move a ground plane.

The process 700 includes disposing a shape memory material in its deformed state within a flexible dielectric material, at 702. For example, referring to FIGS. 2A and 3A, the SMA material in its deformed state may be disposed with the second dielectric structure between the bottom ground plane and the signal plane. When the SMA material is in its deformed state, a signal trace has a first impedance value.

The process 700 includes heating the shape memory material to change from the deformed shape to an original/non-deformed shape to vary an impedance of a signal trace, at 704. As an example, referring to FIG. 2B, heating the SMA material results in a change of separation between a ground plane and the signal plane that results from movement of the signal plane. The change of separation results in a change of the impedance of the signal trace from the first impedance value to a second impedance value. As another example, referring to FIG. 3B, heating the SMA material results in a change of separation between a ground plane and the signal plane that results from movement of the ground plane. The change of separation results in a change of the impedance of the signal trace from the first impedance value to a second impedance value.

Thus, FIG. 7 illustrates an example of a process of utilizing a shape memory material (e.g., an SMA material) disposed within a flexible dielectric material to vary an impedance of a signal trace. In some cases, a change of an impedance value of the signal trace may result from movement of a signal plane when the shape memory material reverts from its deformed state to its original/non-deformed state. In other cases, the change of the impedance value may result from movement of a ground plane when the shape memory material reverts from its deformed state to its original/non-deformed state.

Figure 8:
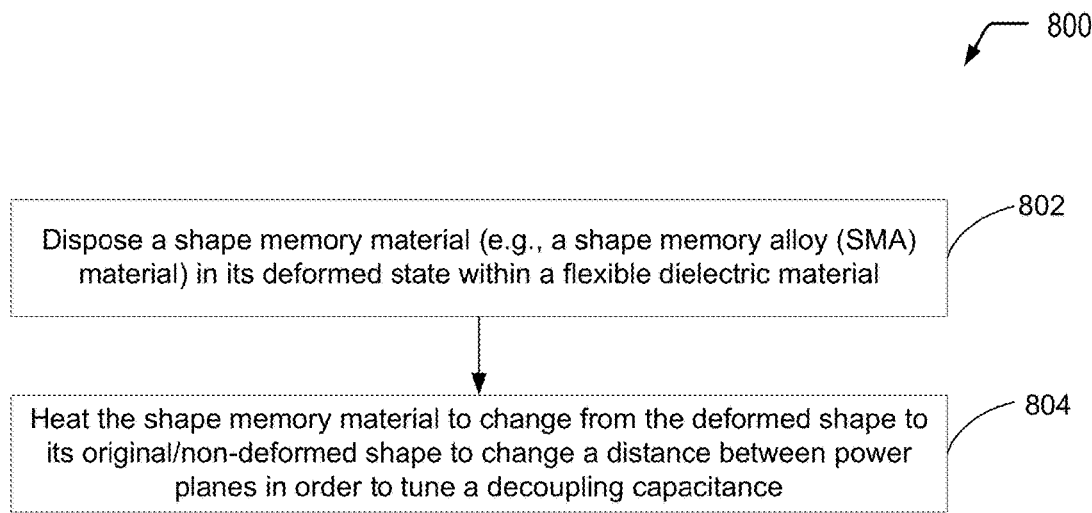
FIG. 8 is a flow diagram showing a particular embodiment of a process of utilizing a shape memory material to change a distance between power planes in order to tune a decoupling capacitance.

Referring to FIG. 8, a flow diagram illustrates an example of a process 800 of utilizing a shape memory material to change a distance between power planes in order to tune a decoupling capacitance, according to one embodiment. In some cases, the shape memory material may include an SMA material having a diaphragm shape, as illustrated and described herein with respect to FIGS. 4A and 4B. In other cases, the shape memory material may have a cylindrical shape, as illustrated and described herein with respect to FIGS. 5A and 5B. In other cases, the shape memory material may include an SMP material that is used to form a dielectric material.

The process 800 includes disposing a shape memory material in its deformed state within a flexible dielectric material, at 802. For example, referring to FIGS. 4A and 5A, the SMA material in its deformed state may be disposed in a flexible dielectric material between the ground plane and the voltage plane. When the SMA material is in its deformed state, the power plane structure has a first decoupling capacitance value. As another example, referring to FIGS. 6A and 6B, the shape memory material may include the SMP material that is used as the flexible dielectric material.

The process 800 includes heating the shape memory material to change from the deformed shape to an original/non-deformed shape to change a distance between power planes in order to tune a decoupling capacitance, at 804. As an example, referring to FIG. 4B, heating the diaphragm-shaped SMA material results in a change of separation between the voltage plane and the ground plane that results from movement of the voltage plane. The change of separation results in a change of the decoupling capacitance from the first decoupling capacitance value to a second decoupling capacitance value. As another example, referring to FIG. 5B, heating the cylindrically shaped SMA material results in a change of separation between the voltage plane and the ground plane that results from movement of the voltage plane. The change of separation results in a change of the decoupling capacitance from the first decoupling capacitance value to a second decoupling capacitance value. As yet another example, referring to FIG. 6B, heating the SMP material causes the deformed SMP material to contract, resulting in a change of separation between the voltage plane and the ground plane that results from movement of the voltage plane. The change of separation results in a change of the decoupling capacitance from the first decoupling capacitance value to a second decoupling capacitance value.

Thus, FIG. 8 illustrates an example of a process of utilizing a shape memory material (e.g., an SMA material disposed within a flexible dielectric material or an SMP material that is used as the flexible dielectric material) to change a distance between power planes in order to tune a decoupling capacitance.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A flexible electronic circuit comprising:
   a power plane structure comprising a first power plane layer and a second power plane layer; and
   a shape memory material disposed between the first power plane layer and the second power plane layer,
   wherein a plane capacitance between the first power plane layer and the second power plane layer corresponds to a first plane capacitance value when the shape memory material is in a deformed state, and wherein the plane capacitance corresponds to a second plane capacitance value when the shape memory material is in a non-deformed state.

2. The flexible electronic circuit of claim 1, wherein the shape memory material includes a shape memory alloy (SMA) material disposed within a flexible dielectric material.

3. The flexible electronic circuit of claim 2, wherein the SMA material is a diaphragm-shaped material.

4. The flexible electronic circuit of claim 2, wherein the SMA material includes a cylindrically-shaped material.

5. The flexible electronic circuit of claim 2, wherein the flexible dielectric material is formed from a flexible adhesive bonding material.

6. The flexible electronic circuit of claim 2, wherein the flexible dielectric material is formed from an ion gel.

7. The flexible electronic circuit of claim 1, wherein a change from the first plane capacitance value to the second plane capacitance value is determined based on movement of a voltage plane that results from the shape memory material transitioning from the deformed state to the non-deformed state.

8. The flexible electronic circuit of claim 1, wherein the shape memory material includes a shape memory polymer (SMP) material that forms a flexible dielectric material between the first power plane layer and the second power plane layer.

9. A process of utilizing a shape memory material to vary an impedance value of an embedded signal trace of a flexible electronic circuit, the process comprising:
   disposing a shape memory material in a deformed state within a flexible dielectric material of a flexible electronic circuit that includes an embedded signal trace; and
   heating the shape memory material to change the shape memory material from the deformed state to a non-deformed state,
   wherein the embedded signal trace has a first impedance value when the shape memory material is in the deformed state, and wherein the embedded signal trace has a second impedance value when the shape memory material is in the non-deformed state.

10. The process of claim 9, wherein the shape memory material includes a shape memory alloy (SMA) material.

11. The process of claim 10, wherein the SMA material is a diaphragm-shaped material or a cylindrically-shaped material.

12. The process of claim 9, wherein the flexible dielectric material is formed from a flexible adhesive bonding material or from an ion gel.

13. The process of claim 9, wherein a change from the first impedance value to the second impedance value is determined based on movement of a signal plane that results from the shape memory material transitioning from the deformed state to the non-deformed state.

14. The process of claim 9, wherein a change from the first impedance value to the second impedance value is determined based on movement of a ground plane that results from the shape memory material transitioning from the deformed state to the non-deformed state.

15. A process of utilizing a shape memory material to vary a distance between power plane layers of a power plane structure of a flexible electronic circuit, the process comprising:
   disposing a shape memory material in a deformed state between a first power plane layer and a second power plane layer of a power plane structure of a flexible electronic circuit; and
   heating the shape memory material to change the shape memory material from the deformed state to a non-deformed state,
   wherein a plane capacitance between the first power plane layer and the second power plane layer corresponds to a first plane capacitance value when the shape memory material is in the deformed state, and wherein the plane capacitance corresponds to a second plane capacitance value when the shape memory material is in the non-deformed state.

16. The process of claim 15, wherein the shape memory material includes a shape memory polymer (SMP) material that forms a flexible dielectric material between the first power plane layer and the second power plane layer.

17. The process of claim 15, wherein the shape memory material includes a shape memory alloy (SMA) material disposed within a flexible dielectric material.

18. The process of claim 17, wherein the SMA material is a diaphragm-shaped material or a cylindrically-shaped material.

19. The process of claim 17, wherein the flexible dielectric material is formed from a flexible adhesive bonding material or from an ion gel.

* * * * *